(12) United States Patent
Rouleau

(10) Patent No.: US 6,829,055 B1
(45) Date of Patent: Dec. 7, 2004

(54) ANGULAR POSITION SENSOR ASSEMBLY FOR USE WITH STEERING COLUMN

(75) Inventor: James E. Rouleau, Burt, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/636,948

(22) Filed: Aug. 7, 2003

(51) Int. Cl.[7] .......................... G01B 11/14; G01D 5/34
(52) U.S. Cl. ............... 356/617; 250/231.13; 250/237 G
(58) Field of Search ............................... 356/614–617; 250/231.13, 231.14, 231.16, 231.18, 237 G; 341/11, 13; 180/79.1; 33/356

(56) References Cited

U.S. PATENT DOCUMENTS

| | | | |
|---|---|---|---|
| 4,154,672 A | * | 5/1979 | Wiley et al. .................. 378/89 |
| 4,937,945 A | * | 7/1990 | Schofield et al. ............. 33/356 |
| 5,067,576 A | * | 11/1991 | Bober ......................... 180/446 |
| 5,818,038 A | * | 10/1998 | Kerkmann et al. ..... 250/231.13 |
| 6,134,983 A | | 10/2000 | Armstrong et al. |
| 6,138,525 A | | 10/2000 | Riefe et al. |
| 6,158,132 A | | 12/2000 | Kofink et al. |
| 6,240,652 B1 | | 6/2001 | Bobel et al. |
| 6,248,993 B1 | | 6/2001 | Bunselmeier et al. |
| 6,304,190 B1 | | 10/2001 | Blasing |
| 6,389,924 B1 | | 5/2002 | Ryne et al. |
| 6,400,140 B1 | | 6/2002 | Lee |
| 6,400,142 B1 | | 6/2002 | Schroeder |
| 6,759,648 B2 | * | 7/2004 | Baxter et al. .......... 250/231.13 |

FOREIGN PATENT DOCUMENTS

FR          2502570    *   3/1981

OTHER PUBLICATIONS

Publication dated Jan. 1993, from SIAM News, vol. 26, No. 1, author Barry Cipra, entitled "The Ubiquitous Reed–Solomon Codes".
Internet article dated Aug. 5, 2002, from website www.qsl.net, author unknown, entitled "Digital Position Encoders".
Technical Drawing dated Sep. 17, 1998, from US Digital, entitled "1" Disk/Module Mounting".

* cited by examiner

Primary Examiner—Gregory J. Toatley, Jr.
Assistant Examiner—Sang H. Nguyen
(74) Attorney, Agent, or Firm—Michael D. Smith

(57) ABSTRACT

An absolute angular position sensor assembly for use with a vehicle steering column that generally includes a digitally encoded disk, an optical output device and an optical input device. The encoded disk has numerous circumferentially extending, concentric data tracks; some of these tracks include cutouts representing absolute angular position bits and some include cutouts representing error correcting bits. Preferably, the absolute angular position bits are arranged according to a grey-code type arrangement, while the error correction bits include Reed-Solomon error detecting and correcting information. The optical output device shines light against the encoded disk such that a pattern, generally determined by the cutouts, is formed on the optical input device. The optical input device, in turn, utilizes that pattern to generate an angular position signal representative of the absolute angular position of the steering wheel and having error correction information.

15 Claims, 3 Drawing Sheets

ANGULAR POSITION SENSOR ASSEMBLY FOR USE WITH STEERING COLUMN

FIELD OF THE INVENTION

The present invention relates to an angular position sensor for use with a vehicle steering column assembly, and more particularly, an angular position sensor capable of providing a digital electronic signal representative of the absolute position of a steering wheel that utilizes error correction features.

BACKGROUND OF THE INVENTION

Various types of angular position sensors are currently used in conjunction with vehicle steering wheels, or hand wheels, including relative, absolute, analog and digital angular position sensors. A relative angular position sensor measures the angular position of a rotating object by either incrementing or decrementing a counter, depending upon the rotational direction of the object, and relating that information to an angular reference point. A sensor of this type has the advantage of being able to operate with minimum complexity. For instance, a relative angular position sensor can determine the rotational position of a steering wheel by using a data wheel having only two bits, or "tracks", of information. On the other hand, this type of sensor has the disadvantage of being unable to independently determine the angular position of an object at any one moment. Stated differently, this type of sensor requires an angular reference point, or starting point. Rotational movement away from this point causes the sensor to either increment or decrement a counter, depending upon the direction of rotation. If the object is rotated too quickly or there is a damaged track such that an increment or decrement is missed, then all subsequent angular position readings will be incorrect. Furthermore, if power to the sensor is ever interrupted such that the information in the counter is lost, then the sensor will have to utilize a reset or reference type feature to begin again.

Conversely, an absolute angular position sensor uses a unique position identifier for each angular position, thus, it is capable of measuring the angular position of a steering wheel independently of an angular reference point. This type of position sensor divides the total possible angular extent of the steering wheel's rotation (typically 1800°) into angular positions. Each position is assigned a unique position identifier, which is typically represented as a combination of binary data bits. If a greater resolution is required, then the number of positions, and hence data bits, is increased, thus decreasing the angular extent of each of the positions. For example, if an absolute angular position sensor for a steering wheel must have a resolution of 0.5, then at least 12 bits of information are required $((1800/2^{12})<0.5)$. There are various techniques for determining the absolute angular position of a rotatable object, some of those techniques are disclosed in U.S. Pat. Nos. 6,240,652, 6,248,993 and 6,304,190, each of which teaches an absolute angular position sensor for use with a vehicle steering wheel.

Traditionally, most absolute angular position sensors were analog sensors. These types of sensors have certain advantages over their relative position sensing counterparts, and often times utilize Hall Effect or magnetoresistor-type electrical components. An example of an analog absolute angular position sensor is seen in U.S. Pat. No. 6,400,142, which is assigned to the present assignee, Delphi Technologies, Inc. Though, use of this type of sensor is advantageous in many scenarios, certain applications require higher levels of resolution and error correction features to protect against corrupted data. One way to achieve these requirements is through the use of digital sensors.

Digital angular position sensors, while capable of high levels of resolution and error correction, typically measure on object's relative angular position as opposed to its absolute angular position. As previously indicated, relative angular position sensors generally utilize some type of counter and angular reference point, and suffer from certain drawbacks associated therewith. A digital relative angular position sensor could provide a signal where the most significant bits of information indicate the relative angular position, and the least significant bits provide an error correction code.

Thus, it would be advantageous to provide an angular position sensor for use with a vehicle steering wheel, where the sensor enjoys certain advantages associated with absolute and digital angular position sensors, yet avoids certain drawbacks found in relative and analog angular position sensors.

SUMMARY OF THE INVENTION

The above-noted shortcomings of prior art angular position sensors are overcome by the present invention which provides an angular position sensor assembly for use with a vehicle steering column assembly that comprises a digitally encoded disk, an optical output device, an optical input device and a signal output. The encoded disk includes both absolute angular position bits and error correction bits, which may be used by the optical output and input devices to provide an angular position signal that is representative of both the absolute angular position information and error correction information.

According to another embodiment, the present invention provides an angular position sensor assembly similar to that just described, however, this sensor assembly includes an encoded disk also having Reed-Solomon error correction bits and data words that include both angular position information and error correction information.

According to yet another embodiment, the present invention provides a method for determining the absolute angular position of a vehicle steering wheel. This method includes the steps of providing a digitally encoded disk, an optical output device, an optical input device, and a signal output, all of which are similar to those previously mentioned. The method also includes steps related to the emission and reception of light through the encoded disk, as well as generating an angular position signal representative of both absolute angular position information and error correction information.

Objects, features and advantages of this invention include, but are not limited to, providing an improved angular position sensor assembly that is digital, determines the absolute angular position of a steering wheel, and includes error correction features.

BRIEF DESCRIPTION OF THE DRAWINGS

The advantages and features of the angular position sensor of the present invention will be readily apparent with reference to the appended description, claims and drawings, wherein:

DETAILED DESCRIPTION OF A PREFERRED EMBODIMENT

Figure 1:
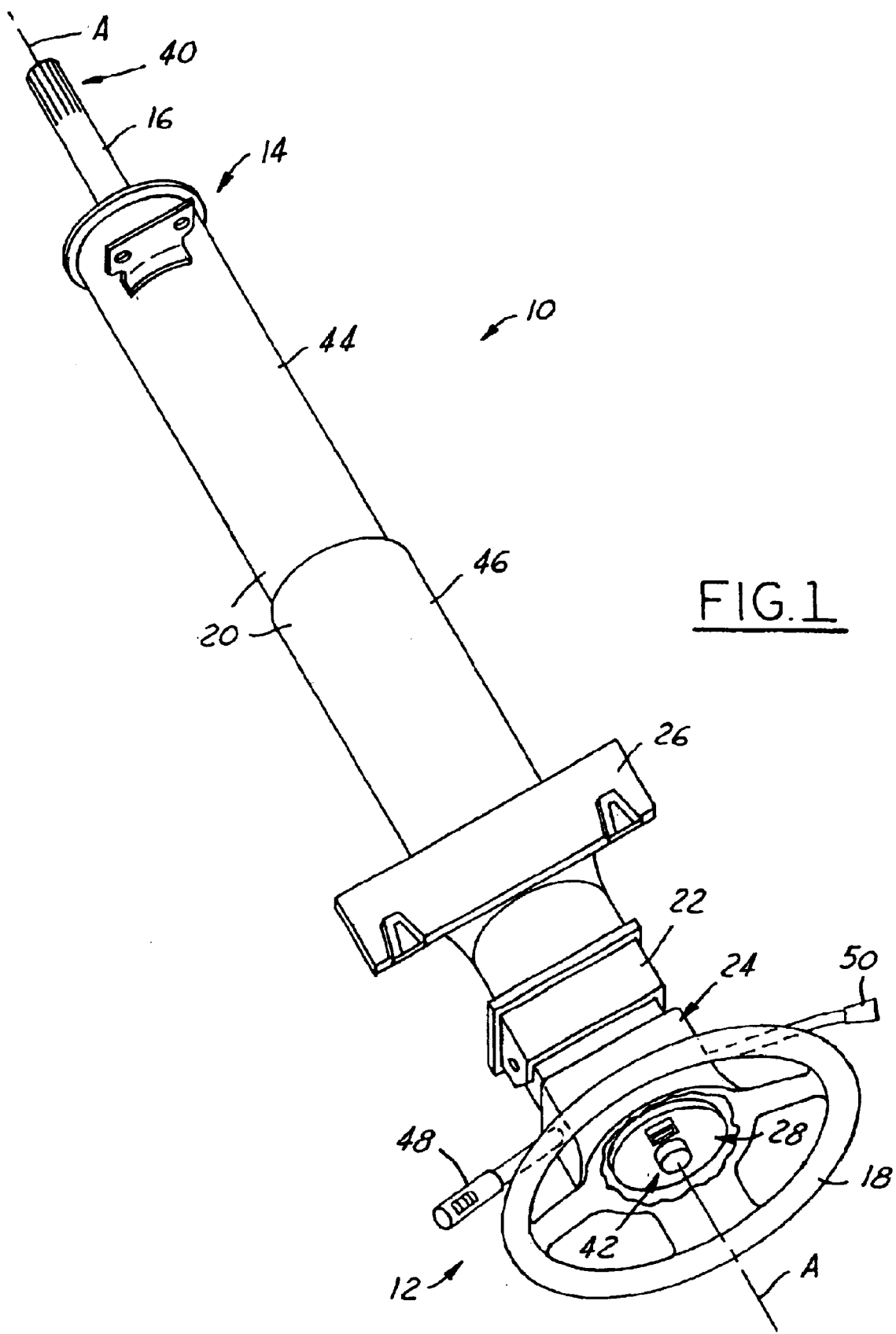
FIG. 1 shows a perspective view of a steering column assembly including the angular position sensor of the present invention.

With reference to FIG. 1, there is shown an example of a vehicle steering column assembly that may be used in conjunction with the angular position sensor assembly of the present invention. In this particular example, the angular position sensor assembly is located towards a front axial end of the steering column assembly; that is, near the location of a steering wheel and hence, an operator. However, the angular position sensor assembly could be located in one of numerous other positions along the steering column assembly, such as towards a rear axial end that is located away from the operator. In generally, the steering column assembly includes an elongated steering column shaft, a steering or hand wheel, a telescoping tubular sleeve, a tilting bracket, a signal control assembly, column mounting feature, and the angular position sensor assembly of the present invention.

The steering column shaft is an elongated tubular component extending along a longitudinal axis of the steering column assembly, and generally includes a rear and a front axial end. The rear axial end of the shaft is coupled to a steering mechanism, such as a rack and pinion mechanism, and the front axial end is fixedly attached to the steering wheel. Consequently, rotational movement of the steering wheel causes a corresponding rotational movement of the steering column shaft, as is widely known in the art. The telescoping tubular sleeve surrounds at least a portion of the shaft, and also extends along the longitudinal axis of the steering column assembly. As its name suggests, the telescoping tubular sleeve is capable of telescoping; that is, the sleeve includes two or more sections of varying diameter such that a smaller diameter section may be retracted within the larger diameter section to alter the axial length of the overall tubular sleeve. The tilting bracket is securely attached to a front axial end of the telescoping tubular sleeve, and allows the steering wheel to be tilted to one of numerous orientations. The signal control assembly is tiltably connected to the tilting bracket, and, in this example, includes left hand and right hand signals. Although not shown, this control assembly could include various combinations of electronic circuits, electro-mechanical switches, the ignition switch, or any other mechanical or electrical device that is appropriately mounted on the steering column assembly. The column mounting feature is simply a mounting bracket for securing the steering column assembly to the vehicle. Lastly, the steering column assembly includes the angular position sensor assembly of the present invention, which will subsequently be described in greater detail.

As previously mentioned, the steering column assembly shown in FIG. 1 has been provided simply as an example of the type of steering column assembly that may operate in conjunction with the angular position sensor assembly of the present invention. It should be recognized, however, that numerous alternative steering column assemblies could also be used with the angular position sensor assembly taught here. For example, the steering column assemblies shown in U.S. Pat. Nos. 6,389,924, 6,138,525, and 6,134,983, which are all assigned to the present assignee, Delphi Technologies, Inc., could also be used with the sensor assembly of the present invention. These U.S. patents are hereby incorporated by reference.

Figure 2:
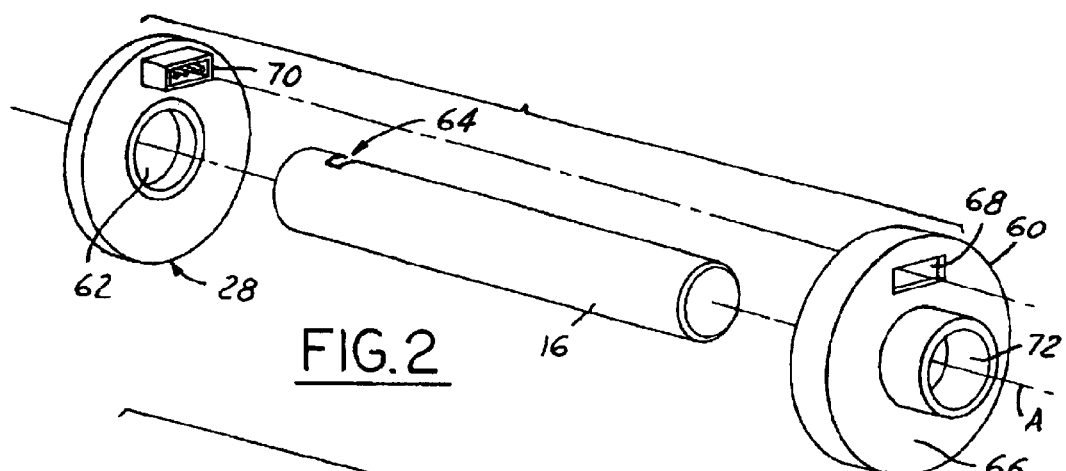
FIG. 2 shows an exploded view of the angular position sensor, steering column shaft and sensor cover of FIG. 1.

Turning now to FIG. 2, the angular position sensor assembly, an axial segment of the steering column shaft and a sensor cover are shown in greater detail. In general, rotational movement of the steering wheel by an operator causes a corresponding rotational movement of the steering column shaft. The steering column shaft rotates within an aperture of the angular position sensor assembly such that the sensor assembly is able to measure the absolute angular position of the shaft. The angular position sensor assembly then provides a digital electronic signal representative of the absolute angular position of the steering column shaft to one or more electrical, electro-mechanical, or other type of device. As seen in the figure, the angular position sensor assembly, the steering column shaft, and the sensor cover are all coaxially aligned with the longitudinal axis of the steering column assembly. The steering column shaft includes a keyed, or otherwise notched, section that interacts with a component of the angular position sensor assembly (not shown in FIG. 2) such that the two components rotate together. Stated differently, a component of the angular position sensor assembly has a section that is complimentarily shaped to the key section of the shaft, such that there is no relative movement between the sections when the steering column shaft is being rotated. Conversely, the angular position sensor assembly also includes a stationary component that does not rotate with the shaft. Thus, a relative rotational movement may exist between the stationary and the rotating components of the angular position sensor assembly, as will be elaborated in greater detail.

The angular position sensor assembly also includes a signal terminal for sending and receiving electronic signals between the sensor assembly and an electrical device. The terminal may be a parallel, serial, or any other appropriate type of port known in the art. Like the angular position sensor assembly, the sensor cover is a generally cylindrical-shaped cover that includes an axially extending aperture at its center for receiving the rotating steering column shaft. When mounted on the steering column assembly, the sensor cover is shaped to fit over top of the angular position sensor, thereby forming a single compact assembly that is protected from damage and interference. In addition to the circular aperture at its center, the sensor cover also includes a rectangular opening which provides access to the signal terminal of the angular position sensor assembly.

Figure 3:
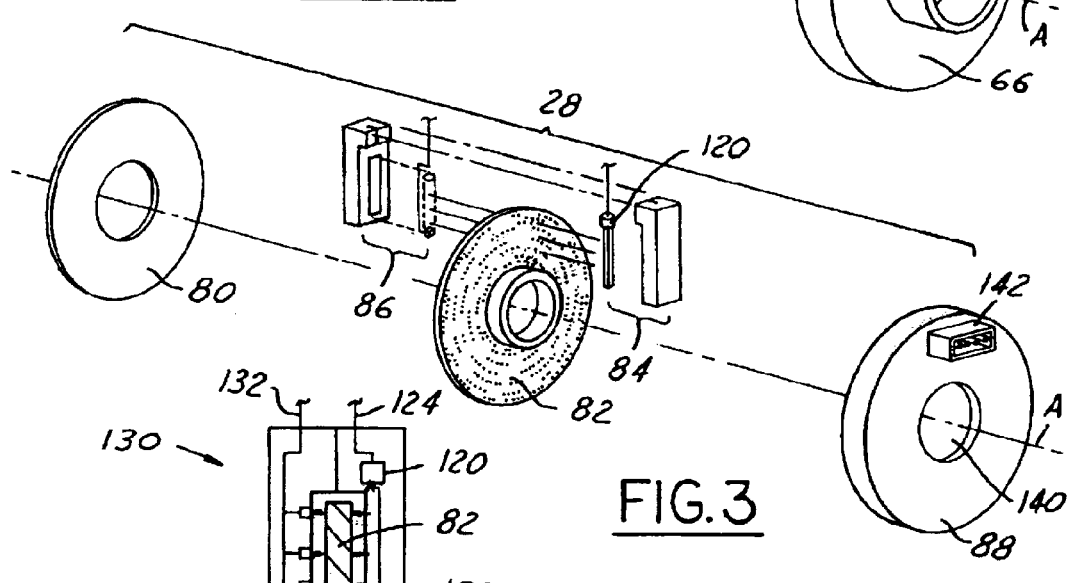
FIG. 3 shows an exploded view of the angular position sensor of FIG. 2.

Referring to FIG. 3, an exploded view of the angular position sensor assembly of the present invention is shown generally including a rear housing component, a digitally encoded disc, an optical output device, an optical input device, a signal output and a front housing component. When assembled, these components form an integral, compact angular position sensor assembly which can easily be mounted to one of numerous positions on the steering column assembly. The rear housing component is a generally circular component that includes a centrally located aperture for rotatably receiving the steering column shaft. The rear housing component is typically located on the rear axial side of the angular position sensor assembly, that is, the axial side of the sensor assembly which is furthest away from the operator. Preferably, the rear and front housing components are comprised of an injection molded plastic, such as ABS, but may be comprised of any other suitable rigid material, such as metal.

Figure 4:
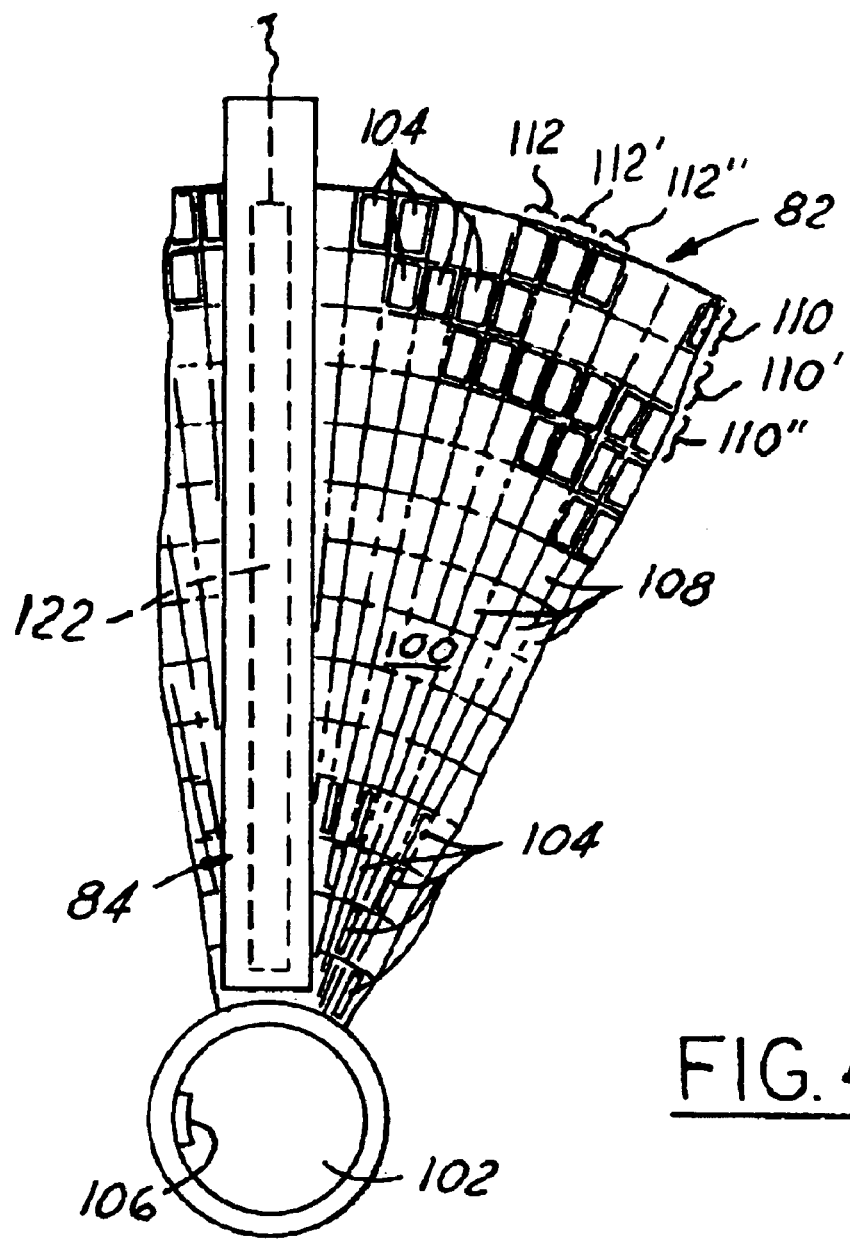
FIG. 4 shows an enlarged, partial view of the digitally encoded disk of FIG. 3.

The digitally encoded disc is best seen in the enlarged, partial view of FIG. 4, and is used by the angular position sensor assembly of the present invention to provide both angular positioning information and error correcting information. The digitally encoded disk generally comprises a rear axial end face (not shown in FIG. 4), a front axial end face, a centrally located aperture, and a series of windows or holes that each extend through the disk. The rear and front axial end faces are generally flat parallel surfaces separated by a small axial distance which determines the thickness of the encoded disk. Preferably, the encoded disk has a thickness of approximately 0.5 mm.

The centrally located aperture is preferably a circular hole that is concentric with the digitally encoded disk and is sized to fixedly receive the steering column shaft. Because the encoded disk and steering column shaft are fixedly connected, there is no relative rotational movement between these components. It follows, that rotation of the steering column shaft creates a corresponding rotation of the digitally encoded disk. The same is not true for optical output and optical input devices; rotation of the steering column shaft causes a relative rotational movement between the optical devices and the digitally encoded disk, as will be explained further in connection with the operation of the angular position sensor assembly. As previously mentioned, the aperture may include some type of keyed, notched, sleeved or other feature along its inner circumference for fixedly connecting the encoded disk to a corresponding keyed section of the steering column shaft, thereby causing the two components to rotated in unison.

Each window represents a single bit of binary information, either angular positioning information or error correcting information, that can be read by the angular position sensor assembly of the present invention to determine the angular position of the steering wheel. The window, which in binary terms may be thought of as representing a '1', and solid sections, which may be thought of as representing a '0', are arranged on the encoded disk according to tracks and slices. A data track is a ring-shaped section of the digitally encoded disk that circumferentially extends around the disk and is usually concentric with the encoded disk itself, the centrally located aperture, and the other data tracks. The number of data tracks per encoded disk is dependent upon the resolution and error correcting capabilities required of the angular position sensor assembly, as is widely known in the art. For example, if 5 of angular resolution is required, then there must be at least data tracks (1800<5) containing angular positioning information. According to one embodiment, a certain number of the radially innermost data tracks include the error correcting information and a certain number of the radially outermost data tracks include the angular positioning information. On the other hand, the angular position information and error correcting information could be contained in data tracks that alternate from one to another; stated differently, error correcting data tracks could be arranged in between angular positioning data tracks, and vice-versa. Again, the ratio of error correcting to positioning data tracks varies according to the particular needs of the application.

The term 'word' is used to describe the pie-shaped sections of the digitally encoded disk that extend from the centrally located aperture to the outer circumference of the disk. Each word corresponds to a unique, absolute angular position (actually a small range of angular positions, as there are a finite number of slices on the encoded disk), and therefore must have a unique identifier. If the identifiers were not unique, the angular position sensor assembly could confuse one slice with another and potentially would not be able to provide an absolute angular position reading. It should be seen, the greater the number of word, the greater the resolution of the sensor, and the smaller the angular extent of each word, and vice-versa. For instance, the seven data track example above would provide one hundred twenty-eight (2^7=128) unique combinations of identifiers. Accordingly, there could be up to one hundred twenty-eight word. The size, shape and other characteristics of the cutouts or the solid sections could differ from those shown here, as long as an optical output device is able to emit light towards the encoded disk such that the portion of the emitted light which impinges the cutouts passes through the disk to an optical input device, and the portion of the emitted light which impinges the solid sections is prevented from reaching the optical input device.

Figure 5:
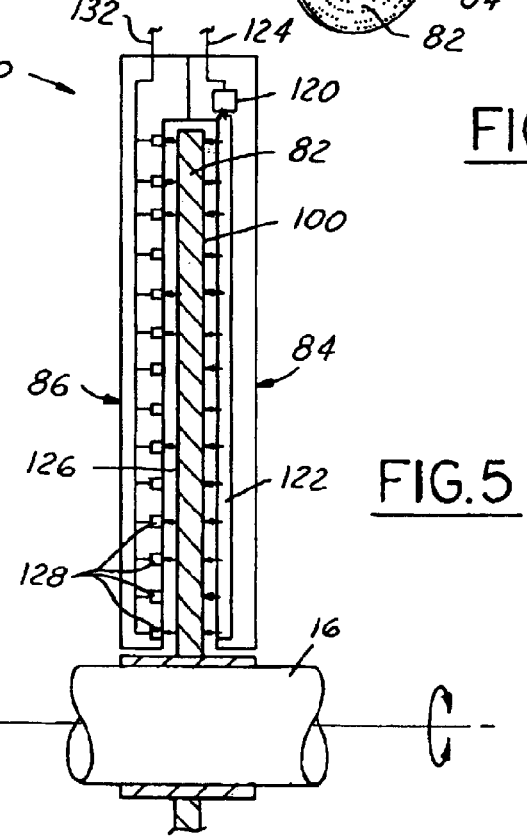
FIG. 5 shows a side view of the angular position sensor of FIG. 2.

Referring now to FIGS. 4 and 5, two perspectives are provided for showing the optical input and optical output devices of the angular position sensor assembly reading encoded information from the digitally encoded disk. Generally, the optical output device is an elongated finger-like component that extends along a majority of the radius of the encoded disk such that it is in close proximity to one of the axial end faces. The optical output device could include one of a number of different types of light emitting components, but preferably utilizes LEDs. Therefore, in the example above where there were seven data tracks dedicated to angular position information, the optical output device would include seven photo of codes of CCDS for reading those tracks. Each of the photo detectors is connected to the circuit board of FIG. 3 by way of an individual connection, a bus connection, or any other appropriate connection known in the art. This allows the electronic circuit to selectively energize and thereby control the operation of the various LEDs, as will be subsequently explained in more detail.

Referring back to FIG. 3, the front housing component is shown as a generally cylindrical-shaped component having a center aperture through which the steering shaft may extend, and a signal output aperture for allowing the signal output of the angular position sensor assembly to connect with some other electrical device, such as an application specific integrated circuit (ASIC). The front housing component is designed to receive the digitally encoded disc and the optical output and input devices such that when assembled, the rear and front housing components surround and protect the interior sensor components.

The electronic circuit specifically shown in FIG. 3 is electrically connected to the optical output and input devices, and is located within the angular position sensor assembly. It will of course be appreciated by those skilled in the art, that the electronic circuit could also be located outside of the angular position sensor assembly such that it was connected by way of some electrical connections. Furthermore, the electronic circuit could be a stand alone integrated circuit, such as an ASIC, or it could be part of a larger circuit that, for instance, controls numerous electrical devices within the steering column assembly. Whatever the case may be, electronic circuitry is required for processing the information provided by the angular position sensor assembly.

In operation, rotational movement of the steering wheel by a driver causes a corresponding rotation in both the steering column shaft and the digitally encoded disk. As the digitally encoded disk rotates, an angular displacement is created between the encoded disk and the optical input and output devices. The angular displacement is read by the angular position sensor assembly of the present invention, which determines the absolute angular position of the steering wheel through periodic sampling. Preferably, the electronic circuit periodically samples the absolute angular position of the encoded disk, and hence the steering wheel, at a predetermined sampling rate, required by the application. In general, each time the absolute angular position is sampled, the electrical energization signal sends an electronic signal to the optical output device. This energization signal causes each of the LEDs, or other light emitting components, to emit a pulse of light in a direction generally normal to the axial end surfaces of the digitally encoded disk. Those pulses of light which strike the axial end face of the encoded disk at a location coinciding with a cutout pass through the disk unobstructed, while those pulses of light which strike the axial end face at a location corresponding to a solid section are reflected. Accordingly, the light detecting components of the optical input device receive a pattern of light pulses which may be represented as an electrical signal.

The intersection of a particular data track and a particular slice forms one bit of binary information that is represented as either a cutout or as a solid section. The bits of information read by the optical input device correspond to the total number of bits within the particular slice being read, which equals the sum of angular position bits and error correcting bits. For example, the digitally encoded disk preferably includes seven angular position bits and seven error correcting bits, resulting in a total of fourteen bits and, hence, fourteen data tracks. Of course, an infinite number of ratios of angular position bit-to-error correcting bit could be used. Furthermore, the information stored on the digitally encoded disk could be encoded according to one of numerous techniques and/or methods known in the art.

For example, the angular position bits could be arranged on the digitally encoded disk according to a grey code, as is known in the art. Disks encoded with a grey code are designed such that the data in a particular slice only differs by a single data bit from the data stored in an immediately adjacent slice. For instance, if a particular slice had angular position bits corresponding to the binary representation 0000001, then an immediately adjacent slice could include angular position bits corresponding to the binary representation 0000011, as those slices only differ by a single bit, but the immediately adjacent slice could not include the binary sequence 0000010, as those numbers differ by two bits. Thus, if the angular position sensor assembly reads two angular position bit sequences that differ by more than one bit, then that assembly will know that an error has occurred and a second reading may be obtained. It should be noted, the grey code could be selectively applied to only a certain portion of the total bits being read. Accordingly, it is possible that only five, for example, of the seven angular position bits in the example above are arranged according to a grey code sequence. Also, it should be apparent that the use of a grey code does not require additional error correcting bits. That is, the angular position bits of a particular data track may be arranged according to a grey code sequence without requiring additional error correcting bits in that track. Though this arrangement is helpful in reducing errors, other techniques may be used to further increase the accuracy of the absolute angular position sensor assembly of the present invention.

For instance, a Reed-Solomon error correcting technique may be used to encode the information on the digitally encoded disk. Reed-Solomon techniques have been around for quite some time, and are explained in detail in the publication entitled "Polynomial Codes Over Certain Finite Fields"[1], which is hereby incorporated by reference. The Reed-Solomon information is actually contained on the digitally encoded disk in the form of the error correcting bits, as discussed above. These bits are in addition to the angular position bits to which a grey code may be applied, and can provide great advantages in detecting and correcting corrupt or otherwise damaged angular position information.

Once the light detecting components of the optical input device read both the angular position and error correcting bits of a particular slice, that information is then decoded by the electronic circuit. The optical input device has a signal output which provides an electrical angular position signal, which is representative of the absolute angular position of the steering wheel, to the electronic circuit. The electronic circuit includes an electronic processing device, such as a known microprocessor or microcontroller like the 68H211, which receives the electrical angular position signal. The electronic processing device processes the electrical angular position signal according to decoding software stored in some electronic memory device accessible by the processor. If the disk is encoded with Reed-Solomon information, then Reed-Solomon decoding software, which is known in the art, is required for decoding. Once decoded, the electronic circuit is able to determine the absolute angular position of the steering wheel with an improved degree of accuracy. This information may then be used by other vehicle devices and systems, such as a steering system, suspension system, instrument panel, etc.

It will thus be apparent that there has been provided in accordance with the present invention an angular position sensor assembly for use with a vehicle steering column that achieves the aims and advantages specified herein. It will, of course, be understood that the foregoing description is of a preferred exemplary embodiment of the invention and that the invention is not limited to the specific embodiments shown. For instance, the angular position sensor assembly of the present invention could be arranged such that the optical output and input devices rotated in unison with the steering column shaft and the encoded disk was the stationary. Also, the digitally encoded disk could include angular position bits that were not arranged according to a grey code, and thereby solely depended on a Reed-Solomon type encoding method for detecting and correcting errors. Other changes and modifications will become apparent to those skilled in the art and all such changes and modifications are intended to be within the scope of the present invention.

What is claimed is:

1. An angular position sensor assembly for use with a vehicle steering column assembly, comprising:

a digitally encoded disk that includes a first axial end face, a second axial end face, an aperture for receiving a steering column shaft, a first set of data tracks that include one or more absolute angular position bits, and a second set of data tracks that include one or more error correction bits;

an optical output device positioned adjacent said first axial end face such that said device is capable of emitting light that strikes at least one of said first set of data tracks and at least one of said second set of data tracks;

an optical input device positioned adjacent said second axial end face such that said device is capable of receiving light from said optical output device through at least one of said first set of data tracks and at least one of said second set of data tracks, and;

a signal output electrically coupled to said optical input device, wherein said angular position sensor assembly is capable of providing an angular position signal that is representative of both absolute angular position information and error correction information.

2. The angular position sensor assembly of claim 1, wherein said absolute angular position bits comprise one or more cutouts and one or more solid sections in said digitally encoded disk.

3. The angular position sensor assembly of claim 2, wherein said first set of data tracks comprises a plurality of circumferentially extending tracks that are concentric and radially spaced from each other.

4. The angular position sensor assembly of claim 2, wherein one or more of said first set of data tracks are arranged according to a grey code.

5. The angular position sensor assembly of claim 1, wherein said error correcting bits comprise one or more cutouts and one or more solid sections in said digitally encoded disk.

6. The angular position sensor assembly of claim 5, wherein said second set of data tracks comprises a plurality of circumferentially extending tracks that are concentric and radially spaced from each other.

7. The angular position sensor assembly of claim 5, wherein one or more of said second set of data tracks include Reed-Solomon encoding information.

8. The angular position sensor assembly of claim 1, wherein said digitally encoded disk further includes one or more data slices which comprise(s) one or more of said absolute angular position bits, as well as one or more of said error correction bits.

9. The angular position sensor assembly of claim 8, wherein each of said data slices corresponds to a particular absolute angular position or range of absolute angular positions.

10. The angular position sensor assembly of claim 9, wherein said optical output device and said optical input device read one of said data slices at a time.

11. The angular position sensor assembly of claim 1, wherein said digitally encoded disk is fixedly attached to the steering column shaft such that they rotate together.

12. The angular position sensor assembly of claim 1, wherein said assembly further includes rear and front housing components that surround said digitally encoded disk, said optical output device and said optical input device such that a compact integrated assembly is formed.

13. The angular position sensor assembly of claim 1, wherein said optical output device includes one or more light emitting diodes (LEDs).

14. An angular position sensor assembly for use with a vehicle steering column assembly, comprising:

a digitally encoded disk that includes a first axial end face, a second axial end face, a keyed aperture for fixedly receiving a steering column shaft, a first set of circumferentially extending data tracks that include a series of cutouts and solid sections representing absolute angular position information, a second set of circumferentially extending data tracks that include a series of cutouts and solid sections representing Reed-Solomon error correction bits, and a plurality of data slices that include both angular position information and error correction information;

an optical output device that includes a separate light emitting component for each of said first and second data tracks, said optical output device is positioned adjacent said first axial end face and is aligned with a first data slice such that said light emitting components are capable of emitting light that strikes each of said first and second set of data tracks;

an optical input device that includes a separate light detecting component for each of said first and second data tracks, said optical input device is positioned adjacent said second axial end face and is aligned with said first data slice such that said light detecting components are capable of receiving light from said corresponding light emitting device through said cutouts;

a signal output electrically coupled to said optical input device, wherein said angular position sensor assembly is capable of providing an angular position signal that is representative of both absolute angular position information and Reed-Solomon error correction information.

15. A method for determining the absolute angular position of a vehicle steering wheel, comprising the steps of:

(a) providing a digitally encoded disk that includes an aperture for receiving a steering column shaft, a first set of data tracks that include one or more absolute angular position bits, and a second set of data tracks that include one or more error correction bits;

(b) providing an optical output device positioned adjacent said digitally encoded disk;

(c) providing an optical input device positioned adjacent said digitally encoded disk;

(d) providing a signal output electrically coupled to said optical input device;

(e) causing said optical output device to emit light such that it strikes at least one of said first set of data tracks and at least one of said second set of data tracks;

(f) causing said optical input device to receive light such that it receives light from said optical output device through at least one of said first set of data tracks and at least one of said second set of data tracks, and;

(g) generating an angular position signal that is representative of both said absolute angular position information and said error correction information.

\* \* \* \* \*